United States Patent [19]

Lipo

[11] 4,455,522

[45] Jun. 19, 1984

[54] CURRENT SOURCE INVERTER BED INDUCTION MOTOR DRIVE

[75] Inventor: Thomas A. Lipo, Madison, Wis.

[73] Assignee: General Electric Company, Schenectady, N.Y.

[21] Appl. No.: 404,252

[22] Filed: Aug. 2, 1982

[51] Int. Cl.$^3$ .............................................. H02P 5/40
[52] U.S. Cl. .................................... 318/809; 318/807
[58] Field of Search ........................ 318/803, 807–811; 363/71, 72, 43

[56] References Cited

U.S. PATENT DOCUMENTS

| 3,800,211 | 3/1974 | Tracy | 318/811 |
| 4,314,190 | 2/1982 | Walker et al. | 318/798 |
| 4,349,772 | 9/1982 | Weiss | 318/803 |

OTHER PUBLICATIONS

6-Phase Induction Motors for Current-Source Inverter Drives, by E. Andresen and K. Bieniek, IEEE Conf. Record, Industry Applications Soc., 1981, pp. 607–613.
Cho et al., "Novel Six-Step and Twelve-Step Current-Source Inverters with DC Side Commutation and Energy Rebound", IEEE Transactions on Industry Applications, vol. 1A-17, No. 5, Sep./Oct. 1981, pp. 524–532.

Primary Examiner—David Smith, Jr.
Attorney, Agent, or Firm—William H. Steinberg; James C. Davis, Jr.; Marvin Snyder

[57] ABSTRACT

A drive system for a polyphase induction motor for extending the range of high frequency operation has two current source inverters connected to the polyphase motor to supply power to the motor. Motor speed and motor load are sensed and a circuit responsive to increasing motor speed and decreasing motor loads advances the firing pulses of one inverter while delaying the firing pulses of the other inverter. The advance in firing of one inverter and the delay in firing the other, reduces the effective current supplied to the motor while not decreasing the current available in each inverter for commutation.

4 Claims, 12 Drawing Figures

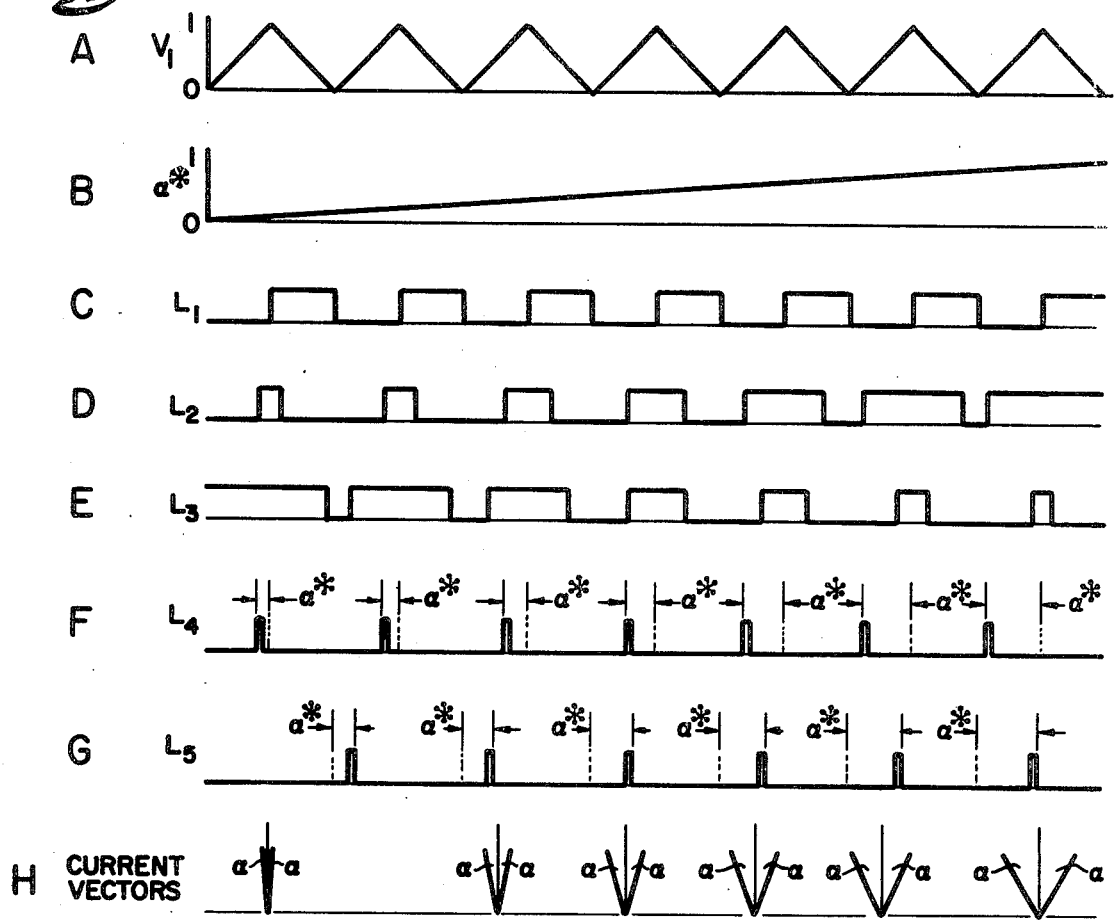
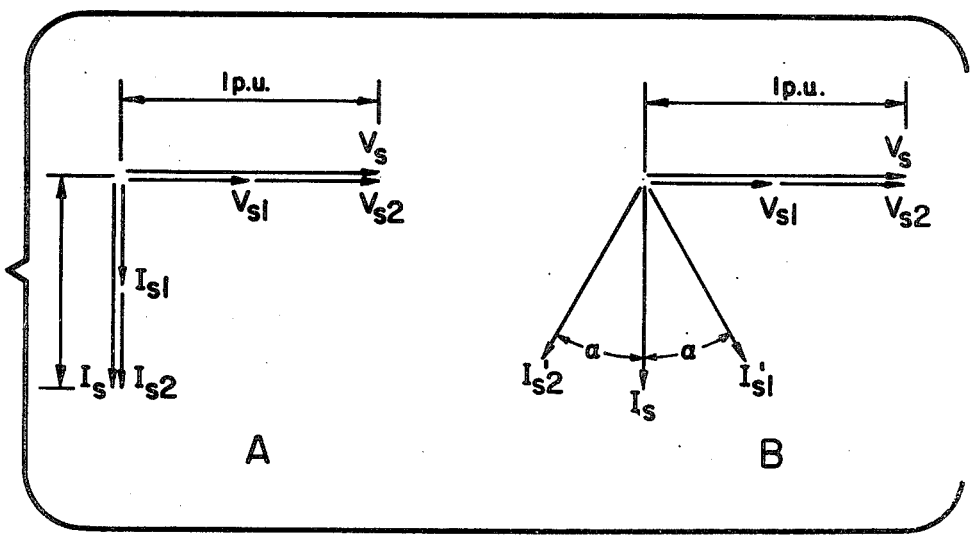

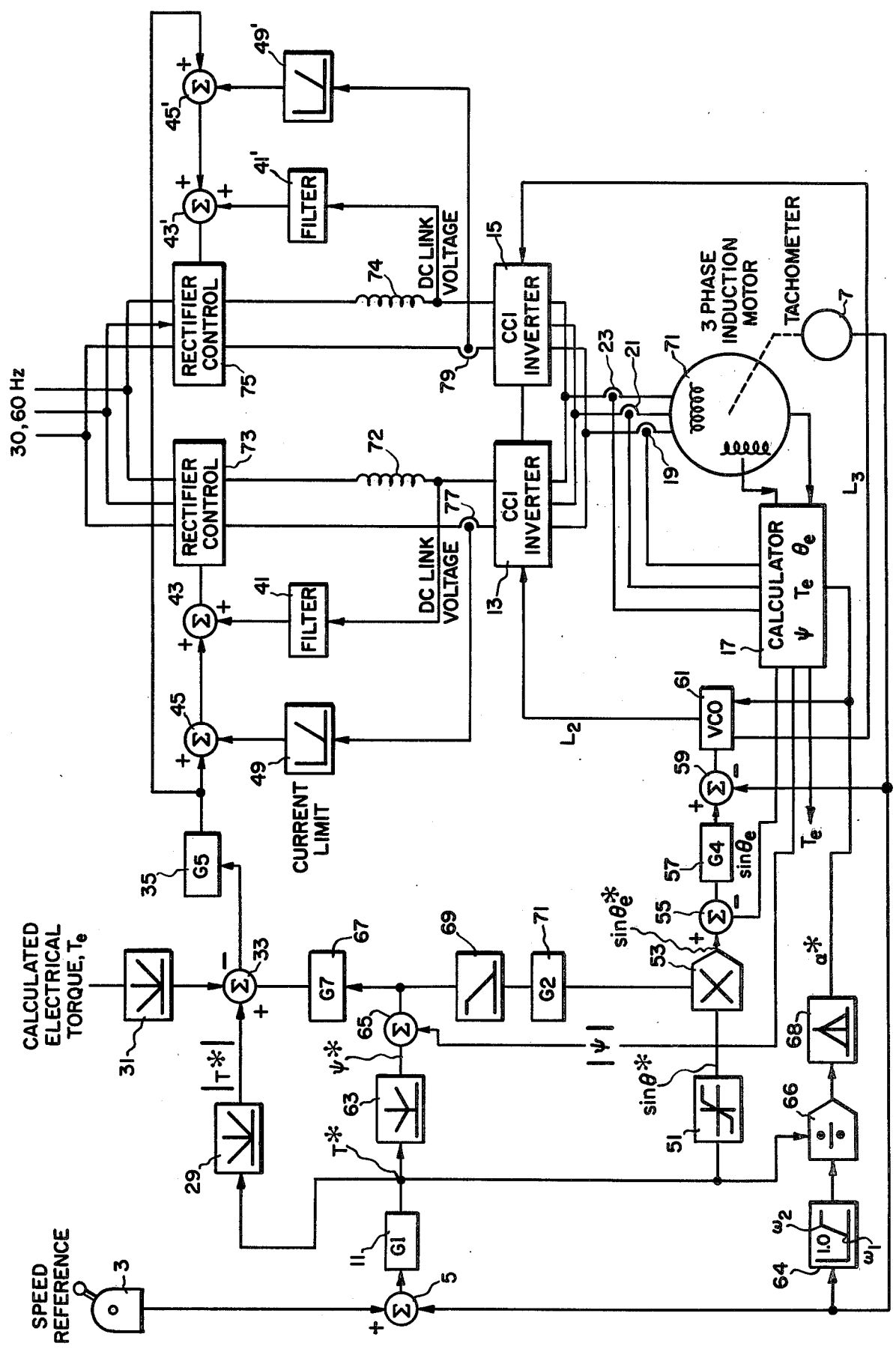

CURRENT SOURCE INVERTER BED INDUCTION MOTOR DRIVE

BACKGROUND OF THE INVENTION

This invention relates to current source inverter fed induction motor drives and more particularly to a control for extending the high frequency operation of an induction motor supplied by current source inverters.

One important feature of a current source inverter is its ability to operate satisfactorily down to zero frequency without commutation difficulties. However, current source inverters have a severely limited high frequency ability since the commutation interval (the time interval required to transfer current from one switching device to another) is much longer for this type inverter than for a voltage source inverter. The solid state devices used in current source inverters are capable of much higher switching frequencies than are utilized because of the upper frequency limits imposed by the commutation process. In general, it is very desirable to increase the output frequency as much as possible since this permits a reduction of size and cost of the associated motor.

At high frequencies, the limitations of commutation are first encountered at light loads (i.e. no load). Above a certain point, the stator frequency becomes sufficiently large that instability occurs. This condition is reached when commutation overlap (time between gating an oncoming thyristor and extinction of the previously conducting diode) becomes 120°. It has been shown that an approximation to this critical frequency can be written in the form $$f_c = 0.0535 \frac{1}{\sqrt{L_k C}} \left[ \sqrt{\left(\frac{2L_k}{L_m}\right)^2 + 4.84 \left(\frac{2L_k}{L_m}\right)} - \frac{2L_k}{L_m} \right] \quad (1)$$

where $L_k$ is the commutation inductance per phase (i.e., the sum of the motor leakage inductances, $L_m$ is the motor magnetizing inductance per phase, and $C'$ is the effective capacitance during commutation.

An examination of equation (1) indicates that the critical frequency can be increased by decreasing the capacitance to as small a value as possible. However, this procedure rapidly becomes impractical because of the increasingly large voltage spikes caused by the shorter commutation time which, in turn, causes increased stresses on the motor winding insulation and increases the voltage rating of the inverter diodes and thyristors. The critical frequency can also be made large by reducing $L_m$. However, only relatively small changes in $L_m$ can be accomplished without substantially increasing the excitation losses of the machine. Also, only relatively small changes in the critical frequency can be introduced by changes in $L_k$.

It is an object of the present invention to provide a control for a current source fed induction motor drive which greatly extends the high frequency operation capability.

SUMMARY OF THE INVENTION

A drive system for a polyphase induction motor for extending the range of high frequency operation has two current source inverters connected to the polyphase motor to supply power to the motor. Motor speed and motor load are sensed and a circuit responsive to increasing motor speed and decreasing motor loads advances the firing pulses of one inverter while delaying the firing pulses of the other inverter. The advance in firing of one inverter and the delay in firing the other increases the current available in each inverter for commutation while not changing the effective current supplied to the motor.

BRIEF DESCRIPTION OF THE DRAWING

The features of the invention believed to be novel are set forth with particularity in the appended claims. The invention itself, both as to organization and method of operation, together with further objects and advantages thereof, may best be understood by reference to the following description taken in conjunction with the accompanying drawing in which:

FIGS. 3A-3H are waveform diagrams helpful in explaining the operation of FIG. 2;

FIG. 4 is a phasor diagram helpful in describing the operation of the present invention; and FIG. 5 is a part block diagram, part schematic representation of another embodiment of a drive system in accordance with the present invention.

DETAILED DESCRIPTION OF THE INVENTION

Figure 1:
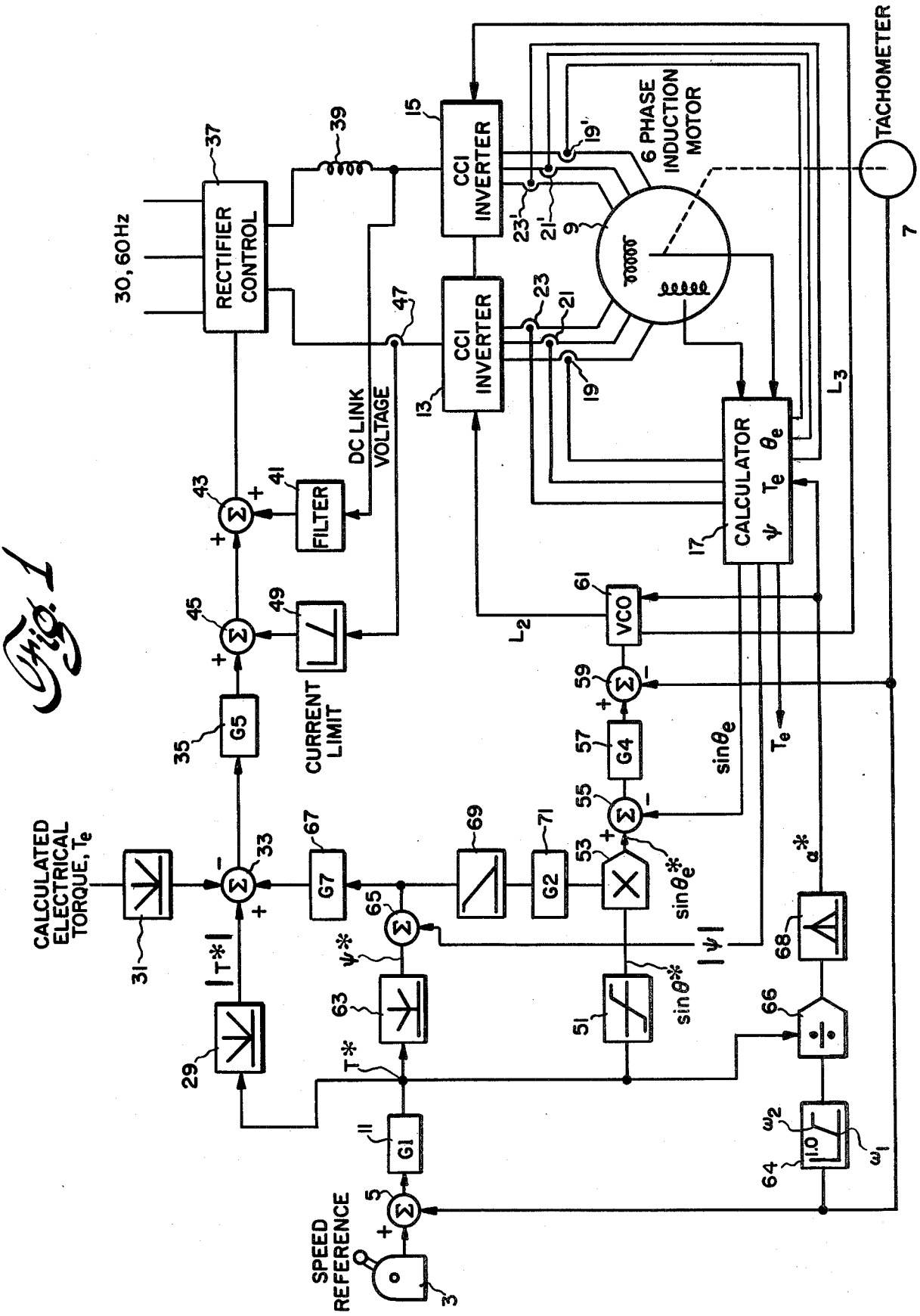
FIG. 1 is a part block diagram part schematic diagram representation of a drive system in accordance with the present invention.

Referring now to the drawing wherein like numerals indicate like elements, there is shown in FIG. 1 a current controlled inverter motor drive 1 in which frequency is used to control flux and current to control torque. A speed regulator 3 provides a speed reference signal to a summing junction 5 where it is compared to a tachometer feedback signal from a tachometer 7. The tachometer is driven by the shaft of a six phase induction motor 9. The output signal from summer 5 is the error signal resulting from the difference between the speed reference and the tachometer feedback signal. The resultant error signal is passed through transfer function G1 in circuit 11 which is a proportional plus integral regulator. The output signal of circuit 11 is a torque reference T*, which controls the operation of current controlled inverters 13 and 15. The torque reference is fed to four control paths, a first path which controls current, a second path which controls flux, a third path which controls frequency and a fourth path which controls the relative phase angle between the currents in inverters 13 and 15 which is also called the contrashift angle.

The feedbacks which will be used in these paths are generated in the motor signal calculator circuit 17. Calculator circuit 17 receives input signals from each of the three phase currents of inverters 13 and 15 from current sensors 19, 21 and 23, and 19', 21' and 23', respectively, and the output voltage of voltage pickup coils 25 and 27 which are located on the direct and quadrature axes of the stator of motor 9, respectively. The motor flux signals are determined by integrating the output of the voltage pickup coils 25 and 27. The six phase currents are combined in vector-sum fashion to generate effective currents and angles in the calculator circuit 17. From the phase currents, direct and quadrature flux and the effective contrashift angle, the calculator circuit 17 determines instantaneous values of flux, torque, and the effective angle between the stator current and air gap flux, using the following equations:

$$|I| \cong \sqrt{i_a^2 + i_b^2 + i_c^2} \quad (2)$$

$$|\psi| = \sqrt{\psi_{qs}^2 + \psi_{ds}^2} \quad (3)$$

$$\cos\theta_e = \frac{|\psi|}{2X_m |I| \cos\alpha} \quad (4)$$

$$\sin\theta_e = \sqrt{1 - \cos^2\theta_e} \quad (5)$$

$$T_e = 2K|I| \, |\psi| \cos\alpha \, \sin\theta_e \quad (6)$$

$$|\psi| = \cos\theta_e \, 2X_m |I| \cos\alpha \quad (7)$$

where
ds and qs subscripts denote direct and quadrature components;
$\psi$ the instantaneous air gap flux;
I the effective stator current three phase rectified;
$i_a$ the effective stator current in phase a;
$T_e$ the instantaneous electrical torque;
K a general constant of proportionality;
$\theta_e$ the approximate angle between stator current and air gap flux;
$\alpha$ actual angle of current shifts from nominal (contrashift angle),
$X_m$ the reactance of the exciting branch of the motor equivalent circuit.

The first control path will now be described neglecting for the moment some of the inputs. The absolute value of the torque command from gain block 11 is determined in absolute value circuit 29. The absolute value of the calculated torque from the calculating circuit 17 is determined in an absolute value circuit 31. The absolute value of the torque reference is compared to the absolute value of the calculated torque at summer 33 and a torque error signal is generated. This error signal is passed through the high gain circuit 35 to generate a voltage command to a rectifier and control 37. Changes in the voltage at the dc link will cause changes in the dc link current which flows in series to the inverters 13 and 15. Changes in the dc link current input to the inverters 13 and 15 changes the motor 9 current which, in turn, causes changes in the motor torque. Thus, the first current path is a closed loop torque regulator acting through current control. The first loop is a fast response loop.

The feedback path of the dc link voltage, taken between the dc link reactor 39 and inverter 15, is passed through a ripple filter 41 to a summing junction 43 which adds the output of the ripple filter to the command provided to the rectifier and controller 37. The feedback is positive and has a gain of 1. This feedback by itself, causes the converter to put out a dc voltage which exactly matches the dc back EMF reflected by the inverters. This serves several purposes. When the reflected dc back EMF of the inverters changes suddenly, this unity gain feedback causes the converter output to track that change, so that the current remains approximately constant without a correction from gain circuit 35. This also causes the signal level in the circuit 35 to be more or less proportional to current only, independent of motor speed or voltage. This helps to maintain the dynamic performance of the drive uniform over very wide changes of operating point.

A current limit function is applied to the rectifier voltage command before summing junction 43 by summing junction 45 which receives an input from a current shunt resistor 47 which has passed through a current limit circuit 49. If flux is transiently low, when a high torque is suddenly commanded, the torque loop would raise current to very high levels. Thus, the current limit function is necessary to avoid excessive transient currents.

The third control path controls the frequency of the inverters 13 and 15 output currents. Its basic mechanism of control is to regulate the angle between the stator current and the air gap flux. This causes the current delivered to be proportioned properly into the flux producing and torque producing axes of the induction motor. The current which is imposed in phase with the existing flux reinforces that flux; the current which is imposed in quadrature with flux produces torque. The torque reference from gain circuit 11 is modified by function generator 51 which can be a clamped gain stage to form an angle reference. The function generator forces operation at an optimum angle. By substituting expression (7) into expression (6) a solution can be found for torque per ampere as a function of angle;

$$\frac{T_e}{|I|^2} = 2K \, X_m (\cos\alpha)^2 \sin 2\theta_e \quad (8)$$

Expression (8) shows that torque per ampere will be maximized at a specific value of $\theta_e = \pm \pi/4$. The actual optimum angle can be determined by computer analysis of the full equivalent circuit, including saturation. This optimum angle may be a function of operating torque level due to saturation effects. As a practical compromise, the angle may be optimized at the highest torque anticipated, and this same angle may be maintained at lower torques above 0.2 per unit (pu). At torque levels below 0.2 pu the function generator causes the angle to go to zero gradually to achieve a desired level of flux at zero torque. The angle reference signal from the angle function generator 51 is provided at one input of a multiplier 53. Assume for the moment that the other input to the multiplier is unity so that the multiplier produces a gain of unity. The angle reference from function generator 51 is compared in summing junction 55 with the measure of the actual instantaneous angle from calculator circuit 17. The instantaneous angle error is amplified by a gain circuit 57 and summed in summer 59 with the actual speed signal from tachometer 7 to form a frequency command to a voltage controlled oscillator (VCO) 61. The voltage controlled oscillator is described in greater detail hereinbelow.

The gain of the tachometer feedback to the VCO is set at unity, so that with no signal at the input of gain circuit 57 the frequency of the inverters 13 and 15 will be zero-slip frequency of the motor at any speed. The output of gain circuit 57 is therefore proportional to the angle between stator current and air gap flux but independent of speed. This helps the drive to maintain uniform dynamic performance over a wide speed range.

The flux is controlled in the second path and performs the following functions: (1) determine the current level at zero torque; (2) corrects the angle obtained from the function generator 51 to account for saturation and other imperfections; and (3) provides an input to allow operation beyond rated speed in the constant horsepower region. The flux generator 63 receives the torque reference from gain circuit 11 and provides a flux command $\psi^*$. The shape of the function is the ideal parabola modified to a fixed level of flux at zero torque. The flux command from the function generator 63 is compared at summer 65 with sensed flux from calculator 17 to form a flux error. The error is fed to the summer 33 in the first control path through a low gain amplifier 67 in a sense to increase current when the flux is below a predetermined value. This will convert the first control path to a flux regulator when torque and torque command are both near zero. The flux error from summing junction 65 is also fed through an offset function generator 69 and a low gain amplifier 71 to the other input of multiplier 53 in the third control path. This causes the multiplier 53 to operate at a gain of one to the angle reference. The sense of the signal provided by amplifier 71 is to decrease the angle between the stator current and the flux when the flux is below a predetermined value. This acts to divert more of the available current into the flux producing axis.

When the torque command is zero, the angle reference is zero and the signal provided from amplifier 71 cannot affect the output of the multiplier 53 to introduce an angle modification. This allows the first control path to control flux through amplifiers 67 at zero torque without disturbing the angle between stator current and air gap flux.

The fourth path receives an input speed signal from the tachometer 7 and the signal is applied to a function generator 64. The function generator provides an output signal at a predetermined first frequency $\omega_1$ and an increasing signal up to a predetermined second frequency when the output reaches a value of one and remains there for input speeds greater than $\omega_2$. The function generator 64 is connected to the denominator input of a divider 66. The torque command signal T* provides the numerator input to the divider 66. The output of the divider 66 is the torque command adjusted as a function of frequency and it is provided to a function generator 68 which in turn provides a smaller commanded contrashift angle $\alpha^*$ in response to increasing torque command with a maximum commanded contrashift angle at zero torque command. At and above $\omega_2$ the torque error signal is provided to the function generator unchanged, below $\omega_2$ but greater than $\omega_1$, the value of the torque command is increased resulting in a smaller commanded contrashift angle than would be obtained from the same torque command at higher frequencies. Below the speed $\omega_1$ the torque command signal is greatly increased before being supplied to the function generator resulting in a commanded zero contrashift angle. The contrashift angle command $\alpha^*$ is provided to the VCO 61 to control the firing of the inverters so as to advance the firing of one inverter three phase group while retarding the other. The VCO 61 has two outputs, one for providing firing pulses to the inverter 13 and the other for providing firing pulses to inverter 15. The actual motor currents will not shift by the same angle that the gating shifts. At high speeds and light loads the shift of motor currents in response to gating angle will be different between the two inverters since one operates with real power regenerating and one with real power motoring. Additional information concerning the first three paths of the control of FIG. 1 is contained in U.S. Pat. No. 4,314,190 entitled "Controlled Current Inverter with Angle Command Limit" and assigned to the same assignee as the present invention. U.S. Pat. No. 4,314,190 is hereby incorporated by reference.

Figure 2:
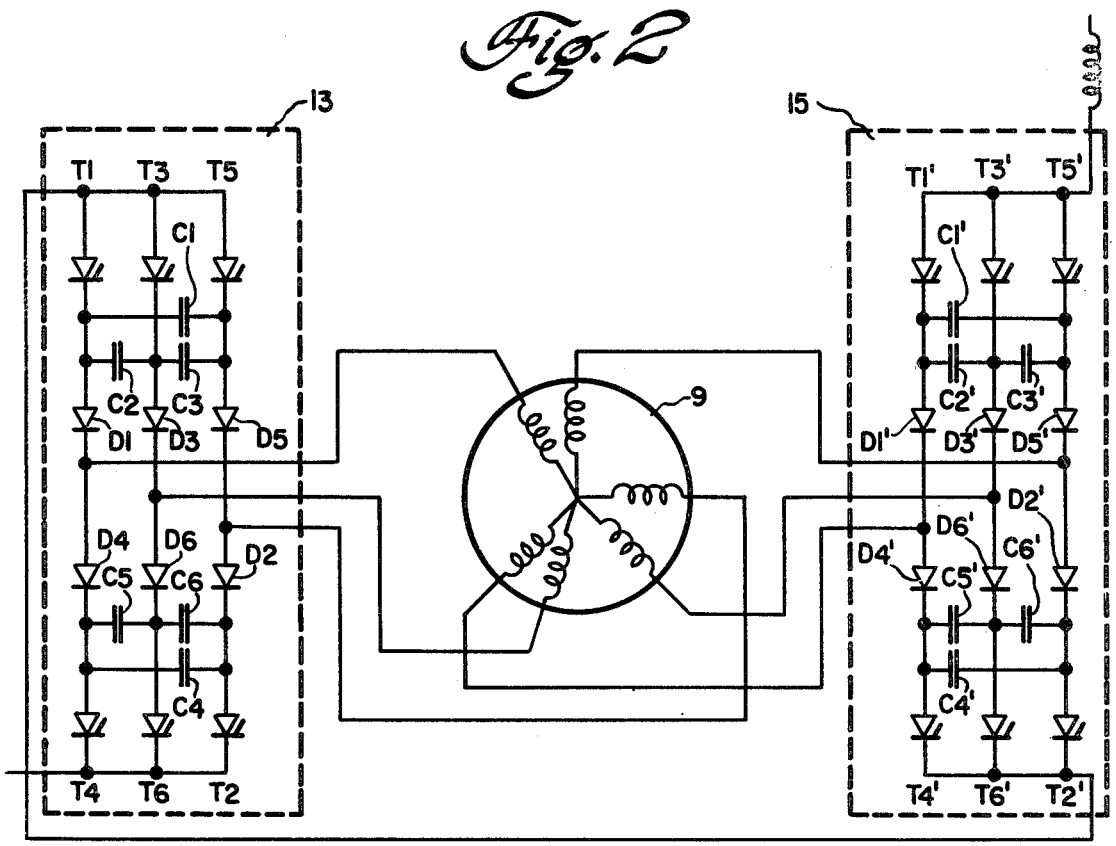
FIG. 2 is a part block diagram, part schematic diagram representation of two current source inverters, firing pulse generator circuit and a six phase induction motor that can be used in FIG. 1.
Figure 2:
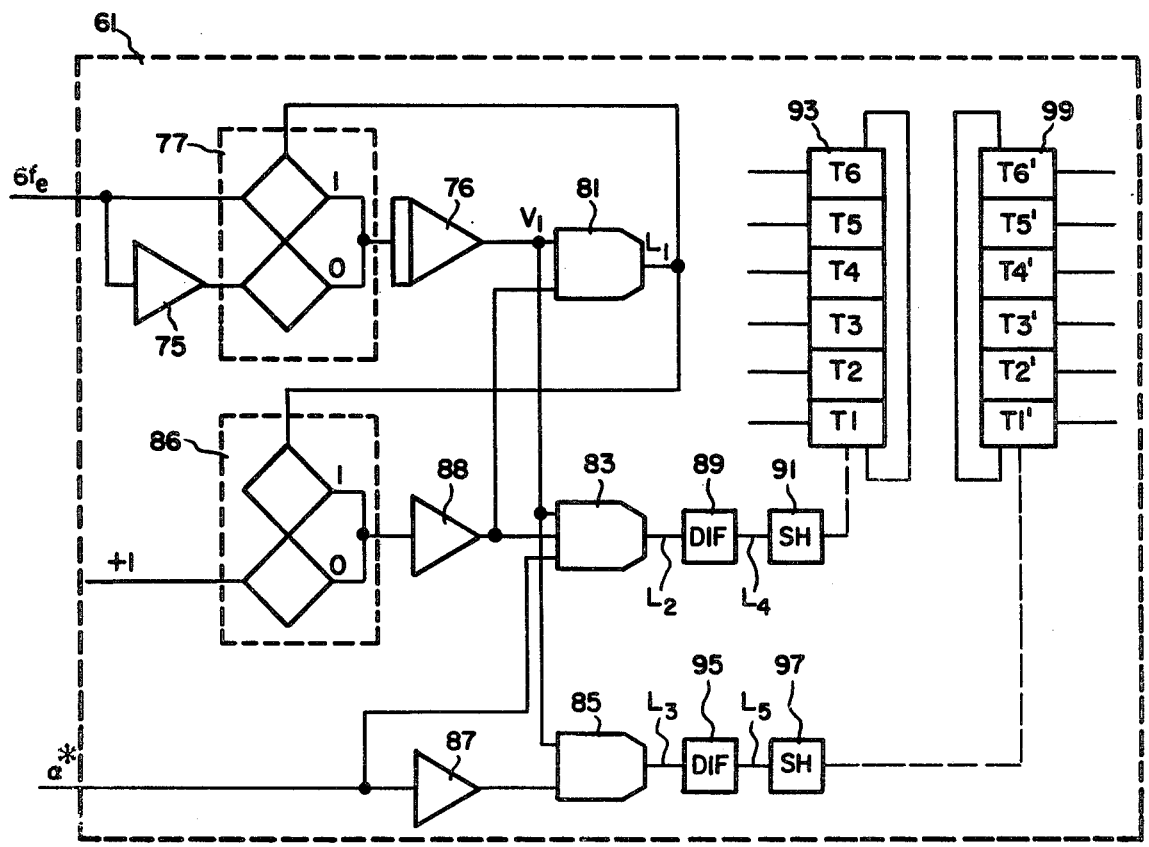

Referring now to FIG. 2, one implementation of the VCO 61 is shown, the two inverters 13 and 15 and the six phase induction motor 9 are shown in more detail. Inverters 13 and 15 are three phase current source inverters of the autosequentially commutated type. Inverters 13 and 15 are connected in series with the negative rail of inverter 15 connected to the positive rail of inverter 13. Inverter 13 has six main thyristors T1-T6, six blocking diodes D1-D6 and six commutating capacitors C1-C6. In a first inverter leg situated between the positive and negative rails, thyristor T1 is in series with diodes D1 and D4 and thyristor T4. In the second inverter leg situated between the positive and negative rails, thyristor T3 is in series with the diode D3 and D6 and thyristor T6. In the third leg situated between the positive and negative rails thyristor T5 is in series with diodes D5 and D2 and thyristors T2. The output of the inverter legs is taken between the upper and lower portion at the junction of the two diodes. Capacitor C1 is connected between the junctions of the thyristors and diodes in the upper portion of the first leg and the third leg. Capacitor C2 is connected between the junction of the thyristors and diodes in the upper portion of the first and second leg. Capacitor C3 is connected between the junctions of the thyristors and diodes in the upper portion of the second and third leg. Capacitor C5, C6 and C7 correspond to capacitor C1, C2 and C3 but are located in the lower portion of the inverter.

Inverter 15 is identically arranged to inverter 13 having elements T1'-T6', D1'-D6' and C1'-C6'. Each of the six output phases from the two inverters is connected to a different electrically isolated winding of the six phase motor 9. The six phase system in motor 9 is built up of two three phase star connected windings displaced 30 electrical degrees, each being supplied by one of the inverters. The six phase windings can be obtained by halving the phase belts of a three phase winding. For a three phase double-layer winding with an even number of slots per phase belt, for example, only some end connections must be changed and the three terminals are replaced by six terminals. The winding itself, that is, the number and shape of the coils, remains unchanged.

The voltage controlled oscillator has an input of commanded fundamental frequency which is a dc value and an input proportional to the commanded contrashift angle $\alpha^*$. The frequency command is connected to the upper input and through a signal inverter 75 to the lower input of a digitally controlled analog switch 77. The output of the analog switch is connected to an integrator 76 which provides a signal to one input of a two input comparator 81, one input to a three input comparator 83 and one input to a two input comparator 85. Each of the comparators 81, 83 and 85 are analog comparators which provide a digital logic ONE output when the sum of the analog inputs is greater than zero and a digital logic ZERO when the sum of the analog inputs is less than or equal to zero.

A digitally controlled analog switch 86 receives a constant input signal at its lower input. The output of the switch 86 is connected to the input of a signal inverter 88. The output of the inverter 88 is connected to the second input of three input comparator 83.

The contrashift angle command $\alpha^*$ is connected to the third input of the three input comparator 83 and through a signal inverter 87 to the other input of comparator 85. The digital output of the comparator 81 provides control signals for switches 77 and 86. The output of comparator 83 is connected to a differentiator circuit 89. A sample and hold circuit 91 is connected to the output of the differentiator and provides a shift signal to a ring counter 93. The ring counter 93 provides gating signals to inverter 13. The output of comparator 85 is connected to a differentiation circuit 95. A sample and hold circuit 97 is connected to the output of a differentiator circuit 95 and provides a shift signal to a ring counter 99. The ring counter 99 provides gate signals to inverter 15.

The operation of VCO 61 will now be explained with reference to FIGS. 3A-H. FIGS. A-G are shown on a common time scale. The frequency command $6f_e$ (which is a dc value) from summer 59 of FIG. 1 causes a triangle waveform to be generated having six times the commanded frequency. The triangle waveform is graphically shown in FIG. 3A. Assume that the output of comparator 81 is a logic level ZERO, this causes the frequency command to be inverted in signal inverter 75 and then connected to the integrator 74. The output voltage of the integrator $V_1$, the waveform of which is graphically illustrated in FIG. 3A, begins to ramp up (the operational amplifier integrator with a negative input signal provides an increasing output signal) as the dc input signal is integrated. The constant dc signal input to switch 86 is connected through signal inverter 88 to one input of comparator 81. The output of the integrator 76 is connected to the comparator 81. When the integrator output reaches a level such that the sum of the input signals to the comparator is greater than zero, the output of the comparator changes to a logic ONE. The digitally controlled switch 77 then connects the input frequency command directly to the integrator and the input from switch 86 is no longer connected to comparator 81. The integrator begins to ramp down (a positive signal input to the operational amplifier integrator results in a decreasing output signal) until zero is reached causing the output of the comparator to produce a logic ZERO signal again. An increasing and decreasing ramp signal from the integrator is one period of a triangle waveform. Assuming that the contrashift command is zero, (the contrashift command value is graphically illustrated in FIG. 3B), the output signal of comparator 83 transitions from a logic level ZERO to logic level ONE at the same time as comparator 81. When the triangle waveform reaches its peak, the comparator 81 output level changes from a logic ZERO to a logic ONE. The output waveform of comparator 81 is graphically illustrated in FIG. 3C. The differentiator provides a spike coincident with the leading edge of the change to the logic ONE level. The spike is sampled in the sample and hold circuit 91 and causes the ring counter to be shifted resulting in a thyristor being fired in inverter 13. With the contrashift command is zero, the output of comparator 85 briefly goes to a logic level ZERO when the triangle waveform attains its ZERO value. When a transition from a logic ZERO level to a logic ONE occurs, a shift command occurs in ring counter 99. The triangle wave is six times the fundamental frequency of the current waveform supplied by the inverters to the motor having a period of 60° of the fundamental frequency. Transition between positive and negative, and negative and positive slopes occur every 30° causing a 30° shift in the pulses provided to the two inverters when the contrashift command is zero and 60° spacing between the pulses supplied to each of the inverters. When a nonzero contrashift command is supplied, the transition from logic levels ZERO to logic level ONE no longer occurs at the same time in comparators 81 and 83. The contrashift command connected to an input of comparator 83 causes the transition from logic level ZERO to ONE to occur sooner compared to the situation in which the contrashift command was zero causing a phase advance in firing the thyristors of inverter 13 proportional to the contrashift command. The contrashift command is inverted in signal inverter 81 and supplied to comparator 85 causing a transition from logic level ZERO to ONE later compared to the situation in which the contrashift command was zero causing a phase delay proportional to the contrashift command. Thus a contrashift command in the present circuit of $\alpha^* = 30°$ would cause the firing pulses of inverter 13 to be advanced by 30° while the firing pulses of inverter 15 would be delayed by 30°. In this manner, the currents of the two inverters can be phase shifted relative to one another as illustrated in FIG. 4.

Referring now to FIG. 4A, a phasor diagram is shown of the voltage per phase of inverters 13 and 15 represented as $V_{s1}$ and $V_{s2}$ respectively. The resulting current phasors from the voltages $V_{s1}$ and $V_{s2}$ are $I_{s1}$ and $I_{s2}$, respectively. With normal gating of the two inverters (no contrashift), the magnetomotive forces corresponding to current phasors $I_{s1}$ and $I_{s2}$ are colinear in space (30° displaced in time) resulting in a net effective current $I_s$ in the motor.

FIG. 4B shows the voltage current phasors when a contrashift angle has been introduced causing the advance of the firing of one of the three phase groups and the delay of the firing of the other three phase groups. Again, the net effective current is $I_s$ the same value as in FIG. 4A. $I_s$ is made up of $I_{s1'} + I_{s2'}$.

Because the currents in the inverters are higher when the contrashift angle is increased, the current to be commutated increases. This, in turn, improves (reduces) the commutation time for a fixed air gap flux.

As the contrashift angle increases, the counter electromotive force (CEMF) at the motor terminals does not change. Yet, more link current is able to flow into the inverters than was possible at the same frequency of operation without contrashift. It can be said that the effect of the CEMF seen at the input of the inverter is reduced but not the CEMF itself.

Referring now to FIG. 5, another embodiment of the present invention is shown. The configuration is the same as that shown in FIG. 1 except a three phase induction motor 71 is supplied by two current controlled inverters 13 and 15 which are connected in parallel. The dc link current supplied to inverter 13 through a link reactor 72 from rectifier and controllers 73 is the same magnitude and direction as the dc link current supplied to inverter 15 through a link reactor 74 from rectifier and controller 75. This is accomplished by providing the same voltage command from gain circuit 35 to separate current limit and filter feedback loops which provide voltage commands to the two rectifiers and controllers 73 and 75, respectively. Rectifier and controllers 73 and 75 are each supplied by a three phase 60 Hz source (not shown). The current supplied to inverter 13 is sensed by a current shunt 77 which provides a signal to a current limit circuit 49 as in FIG. 1 to limit the voltage command from gain circuit 35 during transient conditions. The dc link voltage of inverter 13 is measured between reactor 72 and inverter 13 and applied to ripple filter circuit 41 as in FIG. 1. The current supplied to inverter 15 is sensed by a current shunt 74 which provides a signal to a current limit circuit 49. The dc link voltage of inverter 15 is measured between reactor 74 and inverter 15 and applied to ripple filter circuit 41. The total current supplied to the motor is measured by current sensors 19, 21 and 23.

In operation, when the contrashift command is zero, current controlled inverter 13 and 15 provide output current waveforms that are phase shifted 30 electrical degrees from one another. The two waveforms are combined and supplied to the motor 71. When the contrashift angle commanded is increased, the firing pulses supplied to inverters 13 and 15 are advanced and retarded relative to their previous position by allowing operation at higher speeds with lighter loads than is possible without contrashift.

The foregoing describes a control for current source fed induction motor drive which greatly extends the high frequency operation capability.

While the invention has been particularly shown and described with reference to a preferred embodiment thereof, it will be understood by those skilled in the art that various changes in form and details may be made therein without departing from the spirit and scope of the invention.

What is claimed is:

1. A drive system for extending the range of high frequency operation of a polyphase induction motor comprising:
   a first and second current source inverter connected to the polyphase motor for supplying power thereto;
   means for determining motor speed;
   means for determining the torque the motor is supplying to the load;
   first means responsive to increasing speeds and decreasing motor torque for generating a command for advancing the firing of pulses of one inverter while delaying the firing of pulses of the other inverter by the same amount;
   second means for generating a frequency command signal for said motor; and
   means responsive to said first and second commands for generating firing pulses at the commanded frequency to said inverters to advance the firing of pulses of one inverter while delaying the firing of pulses of the other inverter, so as to increase the current flowing in each inverter.

2. A drive system for extending the high speed range of operation of a six phase induction motor having two electrically isolated three phase windings said drive comprising:
   a first and second current source inverter connected in series, each inverter connected to the motor for providing power to a corresponding three phase winding;
   means for determining motor speed;
   means for determining the torque the motor is supplying to a load;
   first means responsive to motor speed and motor torque for generating a command for advancing the firing of one of said inverters while delaying the firing of the other of said inverters, said command increasing with increasing speed above a predetermined speed and increasing with decreasing motor torque above a predetermined speed;
   second means for generating a frequency command signal for said motor; and
   means responsive to said first and second command signals for generating firing pulses at the commanded frequency to said inverters to advance the firing pulses supplied to one of said inverters while delaying the firing of pulses supplied to said other inverter so as to increase the current flowing in each inverter.

3. A drive system for extending the range of high frequency operation of a polyphase induction motor comprising:
   a first and second current source inverter connected in parallel, each inverter connected to the same polyphase windings;
   means for determining motor speed;
   means for determining the torque the motor is supplying to the load;
   first means responsive to motor speed and motor torque for generating a command for advancing the firing of one of said inverters while delaying the firing of the other of said inverters, said command increasing with increasing speed above a predetermined speed and increasing with decreasing motor torque above a predetermined speed;
   second means for generating a frequency command for said motor; and
   means responsive to said first and second means for generating firing pulses to said inverters at the commanded frequency to advance the firing pulses supplied to one of said inverters while delaying the firing of pulses supplied to said other inverter so as to increase the current flowing in each inverter.

4. The drive in claims 1, 2 or 3 wherein said means responsive to said first and second command signals comprises a first and second ring counter having an output coupled to the first and second inverters, respectively, means responsive to said second command signal for generating a triangle waveform signal having a frequency a predetermined multiple of said commanded frequency, first comparator means for comparing said triangle waveform signal to a first and second predetermined signal levels dependent on the slope of said triangle waveform and said second command signal, the output of said first comparator causing said first ring counter to shift and provide a firing pulse to said first inverter when inputs to the first comparator reaches a predetermined value, second comparator means for comparing said triangle waveform to an inverted first command signal, the output of said second comparator causing said second ring counter to shift and provide firing pulses to said second inverter when the inputs to the second comparator reach a predetermined value.

* * * * *